UNITED STATES PATENT OFFICE.

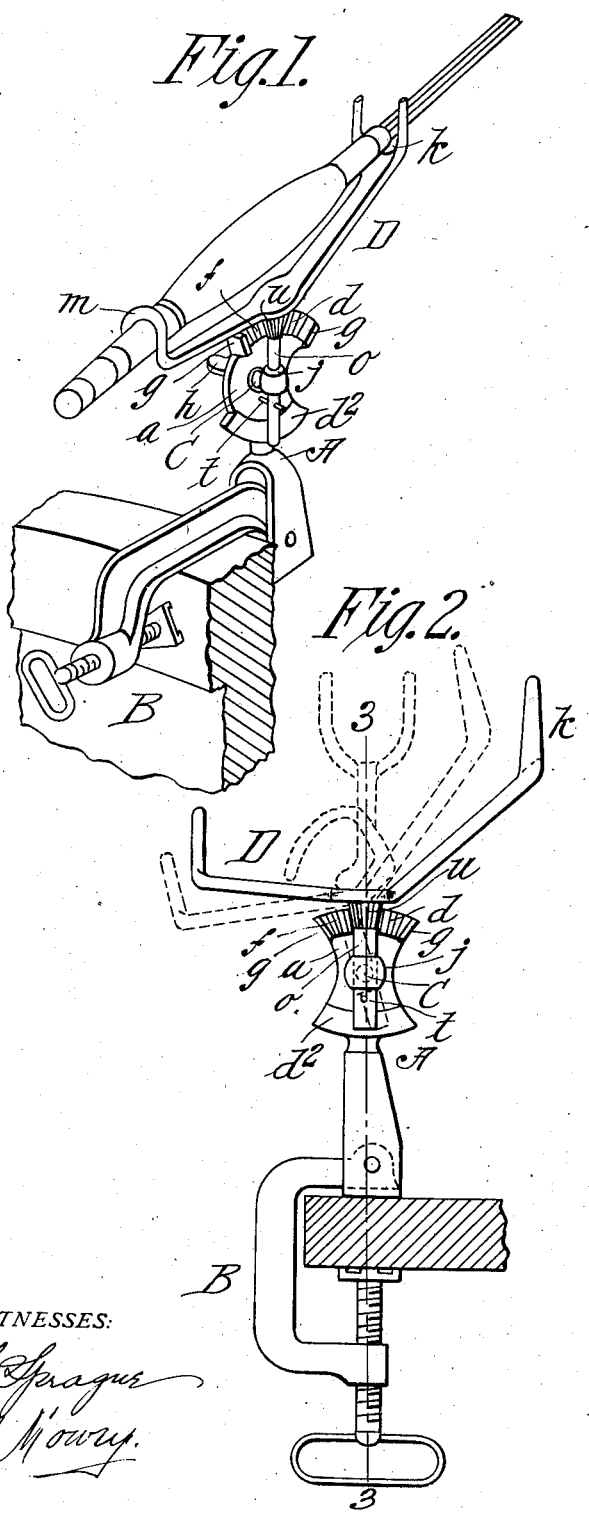

JOHN TOWNE, OF SPRINGFIELD, MASSACHUSETTS.

FISH-ROD HOLDER.

1,025,657.  Specification of Letters Patent.  Patented May 7, 1912.

Application filed January 18, 1912. Serial No. 671,905.

*To all whom it may concern:*

Be it known that I, JOHN TOWNE, a citizen of the United States of America, and resident of Springfield, in the county of Hampden and State of Massachusetts, have invented certain new and useful Improvements in Fish-Rod Holders, of which the following is a full, clear, and exact description.
The object of this invention is to provide a fish-rod-holder, more especially designed for use on boats or canoes, which is of extremely simple and inexpensive construction, and by the use of which a fish rod may be supported and positioned to extend off from the side of the boat, either squarely at right angles thereto or with any degree of inclination forwardly or rearwardly, or to extend in a line practically parallel to the length of the boat, or to be reversed so as to have any of the above referred to positions relatively to the opposite side of the boat and to be susceptible of positioning either in a horizontal line of extension or with an upward or a downward inclination.

The invention is described in conjunction with the accompanying drawings and is set forth in the claims.

In the drawings:—Figure 1 is a perspective view showing the fish-rod-holder, with a fish rod supported thereby, mounted on the side rail of a boat. Fig. 2 is an elevation, as seen at the inner side of the fish rod holder, which latter is shown as mounted on a boat seat. Fig. 3 is a sectional elevation as seen on and beyond the plane indicated by line 3—3, Fig. 2.

In the drawings, A represents an upright support having an attachment clamp B which is so constructed and jointed that it may be used on the side rail of a boat or canoe as represented in Fig. 1, or on the front or rear edge portion of a seat or thwart, as indicated in Figs. 2 and 3. The upper portion of the upright support A is of an approximately circular form, the central part $a$ of which is of an axially horizontal dish shape as more especially represented in Fig. 3; and it has the aperture $b$ therethrough. The portions $d$ and $d^2$ marginally of and above and below the dished part $a$ are in a common vertical plane, but the portion $d$ is made with teeth $f$ in an arc or curve arrangement; and the said part $d$ has the opposite horizontally extended lugs $g\ g$ to form stops.

C represents a screw threaded stud rotatively engaged through the aperture $b$ in the dished portion of the upright support, the same having a clamping thumb nut $h$ thereon at one side of the support and provided with an axially vertical eye $j$ at the other side, such eye forming portion being more or less accommodated within the depression formed in the dish portion of the support.

D represents the fish rod holder made in the form of a frame or bar having an upwardly open yoke $k$ at its forward or outer end, and an inverted hook shaped member $m$ at its opposite end for the retention of the butt portion of a fish rod in a manner common in this general class of devices; and the holder is provided with a depending stem $o$ which is rotatively engaged through the eye member $j$ of the screw stud C, such stem having portions above and below the eye in contact against the substantially plane faced portions $d,\ d^2$ of the support. The stem is provided with a shoulder $t$ below the eye member to act as a stop to prevent the accidental withdrawal of the stem of the fish rod holder upwardly out from the eye member. The portion of the stem $o$ somewhat above the eye member is made of a pinion form, that is the teeth in circular arrangement, as indicated at $u$, for engagement with the teeth $f$ of the upright support.

When the parts have been adjusted for the proper positioning of the fish rod to suit the fisherman, the thumb nut is securely tightened against the outer face of the upright support, binding the depending stem of the fish rod holder against the face of the upright support; and such nut serves the double purpose of preventing rotative movement of the eye provided screw stud, and any swiveling movement of the depending stem of the holder. The rotative movement on its vertical axis of the depending stem is, furthermore, safeguarded against by the provision of the interengagement teeth $f$ and $u$.

By loosening and slightly freeing the thumb nut, the stem of the holder may by its toothed or pinion-like part have a rolling movement on the series of teeth, arranged in an arc at the upper portion of the upright support without being disengaged from mesh with such teeth, at times when the line of lateral extension of the fish pole is to be varied; but for a complete or approximately entire reversal of the holder member D and certain other adjustments thereof, the thumb nut will be loosened to an extent to permit the screw stud to be slid through the upright support sufficiently far to carry the eye engaged stem quite a distance away from the face of the upright so that the interengaging teeth are entirely out of mesh.

I claim:—

1. In a device of the character described, in combination, an upright support provided with an attachment clamp, also provided with a transverse aperture and having a series of teeth on its face, a screw threaded stud engaging through said aperture, having a thumb nut engaging thereon at one side of the upright support, and having a vertical eye at the other side of such support, and a fish-rod-holder provided with a stem, positioned alongside the face of the upright support, rotatively engaged through the said eye, made with a pinion shaped portion for engagement with the teeth on the support, and provided with a shoulder below said eye.

2. In a device of the character described, in combination, an upright support provided with an attachment clamp, and having the upper portion thereof of an axially horizontal dish shape provided with a transverse aperture therethrough, a screw threaded stud rotatively engaged through said aperture having a thumb nut thereon at the outer side of the upright support and having an axially vertical eye partially accommodated within the concave inner side of the support, a fish-rod-holder provided with a depending stem having a position of engagement against the inner face of said upright support, and engaged through the said eye, having a shoulder below the eye, and stops provided on the upright support at opposite sides of said stem for limiting the oscillatory movement of the latter in a vertical plane.

3. In a device of the character described, in combination, an upright support having an attachment clamp and having the upper portion thereof of an approximately circular form, the central part of which is of an axially horizontal dish shape, and having parts thereof marginally of the dished part conformed to a vertical plane, and made above the dished part with a series of teeth in arc arrangement, and having outstanding lugs at the opposite ends of the teeth, a screw threaded stud rotatively engaged horizontally through the dished portion of the support, having a thumb nut thereon at one side of the support, and having an axially vertical eye at the other side, and a fish-rod-holder having a depending stem rotatively engaged through said eye, having the portions above and below such eye in contact against the plane faced portions of the support, having a shoulder below the eye and having its portion above the latter made with a circularly arranged piece for engagement with the teeth of the upright support.

Signed by me at Springfield, Mass., in presence of two subscribing witnesses.

JOHN TOWNE.

Witnesses:
Wm. S. Bellows,
G. R. Driscoll.